US009405668B1

(12) United States Patent
Fallone et al.

(10) Patent No.: US 9,405,668 B1
(45) Date of Patent: Aug. 2, 2016

(54) DATA STORAGE DEVICE INITIALIZATION INFORMATION ACCESSED BY SEARCHING FOR POINTER INFORMATION

(75) Inventors: Robert M. Fallone, Newport Beach, CA (US); David M. Hamilton, Trabuco Canyon, CA (US)

(73) Assignee: Western Digital Technologies, Inc., Irvine, CA (US)

(*) Notice: Subject to any disclaimer, the term of this patent is extended or adjusted under 35 U.S.C. 154(b) by 1267 days.

(21) Appl. No.: 13/027,432

(22) Filed: Feb. 15, 2011

(51) Int. Cl.
*G06F 12/00* (2006.01)

(52) U.S. Cl.
CPC ...................................... *G06F 12/00* (2013.01)

(58) Field of Classification Search
CPC ...................................................... G06F 12/00
USPC ......................................................... 711/156
See application file for complete search history.

(56) References Cited

U.S. PATENT DOCUMENTS

| | | | | |
|---|---|---|---|---|
| 4,086,636 | A * | 4/1978 | Cizmic | G11B 5/553 360/266.6 |
| 4,827,462 | A * | 5/1989 | Flannagan | G06F 3/0601 369/30.09 |
| 4,945,427 | A * | 7/1990 | Cunningham | 360/75 |
| 5,535,355 | A * | 7/1996 | Scales | G06F 11/1417 703/25 |
| 6,073,232 | A | 6/2000 | Kroeker et al. | |
| 6,098,158 | A | 8/2000 | Lay et al. | |
| 6,185,063 | B1 | 2/2001 | Cameron | |
| 6,539,456 | B2 | 3/2003 | Stewart | |
| 6,662,267 | B2 | 12/2003 | Stewart | |
| 6,904,496 | B2 | 6/2005 | Raves et al. | |
| 6,963,951 | B2 | 11/2005 | Ng et al. | |
| 6,967,810 | B2 | 11/2005 | Kasiraj et al. | |
| 6,968,450 | B1 | 11/2005 | Rothberg et al. | |
| 7,082,007 | B2 | 7/2006 | Liu et al. | |
| 7,130,962 | B2 | 10/2006 | Garney | |
| 7,181,608 | B2 | 2/2007 | Fallon et al. | |
| 7,305,539 | B2 | 12/2007 | Br in et al. | |
| 7,408,731 | B2 | 8/2008 | Uemura et al. | |
| 7,417,813 | B2 | 8/2008 | Lim et al. | |
| 7,443,625 | B2 | 10/2008 | Hamaguchi et al. | |
| 7,490,212 | B2 | 2/2009 | Kasiraj et al. | |
| 2003/0095648 | A1 * | 5/2003 | Kaib et al. | 379/106.02 |
| 2003/0135729 | A1 | 7/2003 | Mason, Jr. et al. | |
| 2003/0142561 | A1 | 7/2003 | Mason, Jr. et al. | |
| 2004/0025002 | A1 * | 2/2004 | Cepulis et al. | 713/2 |
| 2004/0064647 | A1 | 4/2004 | DeWhitt et al. | |
| 2005/0071537 | A1 | 3/2005 | New et al. | |
| 2005/0251617 | A1 * | 11/2005 | Sinclair et al. | 711/103 |
| 2006/0294352 | A1 | 12/2006 | Morrison et al. | |
| 2007/0005883 | A1 | 1/2007 | Trika | |
| 2007/0083743 | A1 | 4/2007 | Tsang | |
| 2010/0088482 | A1 * | 4/2010 | Hinz | G06F 12/0246 711/166 |
| 2011/0320685 | A1 * | 12/2011 | Gorobets et al. | 711/103 |
| 2012/0072734 | A1 * | 3/2012 | Wishman | G06F 21/60 713/189 |

* cited by examiner

Primary Examiner — Larry Mackall (57) ABSTRACT

A data storage device including non-volatile storage is initialized from initialization information stored in an information initialization area. A pointer area is also provided on the non-volatile storage for storing initialization pointer information. Pointer information includes a sequence identifier. A processor is configured to read the storage locations in the pointer area and used the information to locate and read initialization information from the located initialization information area to initialize the data storage device. In one embodiment, sequence identifiers are examined to locate most recent sequence identifier for initialization. In other embodiments, more than one initialization area and/or pointer area may be used for robustness.

11 Claims, 6 Drawing Sheets

DATA STORAGE DEVICE INITIALIZATION INFORMATION ACCESSED BY SEARCHING FOR POINTER INFORMATION

BACKGROUND

Data storage devices are ubiquitous in everyday life. For example, nearly all computers have hard disk drives (HDD) or solid state memory for non-volatile storage. There may be multiple types of storage medium, including removable media such as Compact Disk (CD), Digital Versatile Disk (DVD) or Universal Serial Bus (USB) devices for information storage. It is not uncommon for a system to employ multiple types of storage medium.

Many types of data storage devices incorporate programming initialization information needed by the data storage device to operate. It is advantageous to store this information on the storage medium contained in the storage device itself. A small resident program may be used at initialization time to read the initialization information for the data storage device to become fully operational. Some systems may use a boot block that is stored in a permanent fixed location that can be accessed to get the needed information to locate the initialization information.

The present invention overcomes the limitations of the prior art and provides a method of initializing a data storage device robustly.

DETAILED DESCRIPTION OF THE EMBODIMENTS

Figure 1:
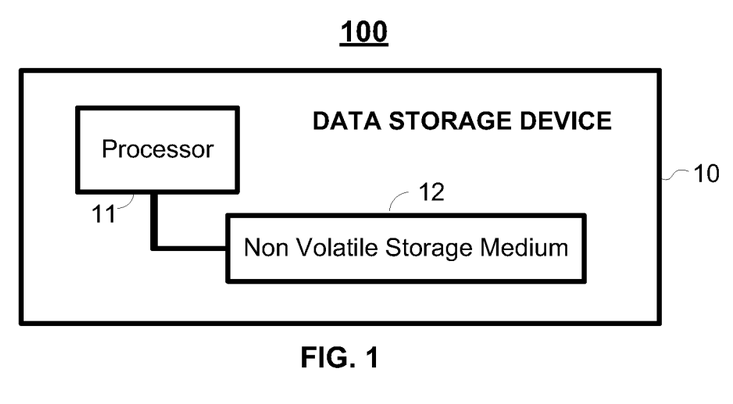
FIG. 1 illustrates a data storage device according to one embodiment.

FIG. 1 illustrates a data storage device 10 according to one embodiment of the invention. The data storage device 10 may be any device containing a processor 11 and a non-volatile storage medium 12. The non-volatile storage medium 12 may be incorporated as part of the device 10, for example as memory chips, magnetic disks, NAND memory, or as peripherals contained on a system bus.

Figure 2:
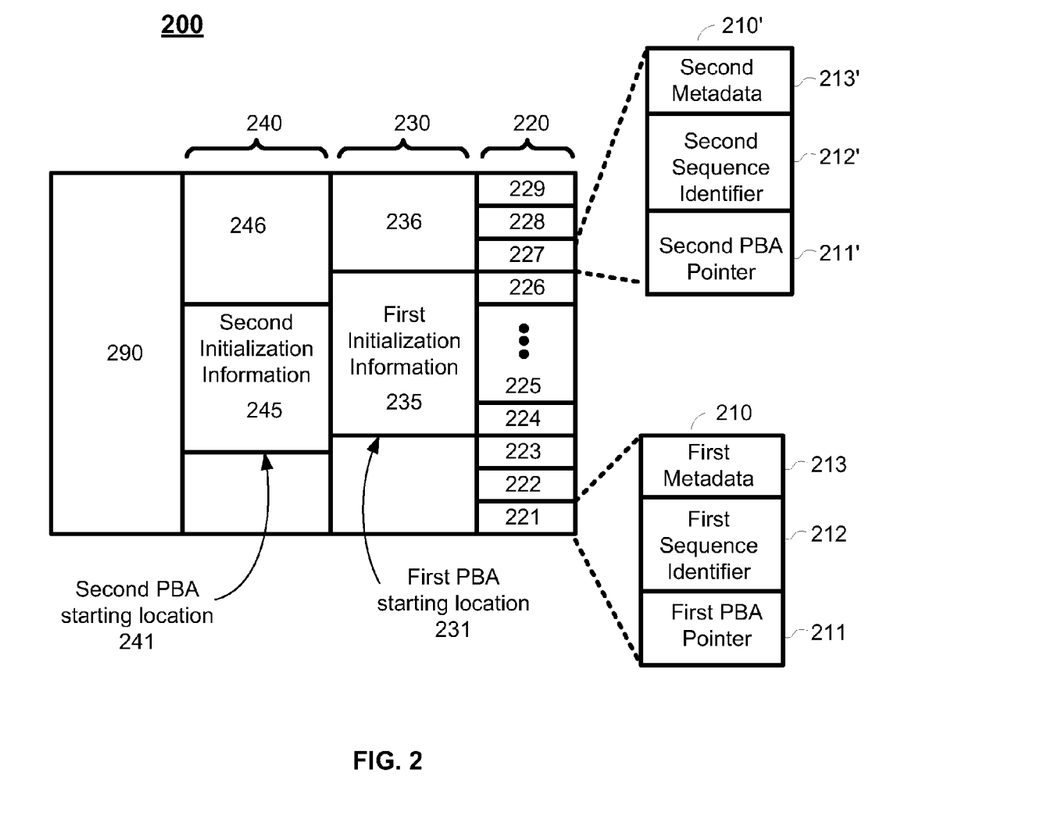
FIG. 2 illustrates initialization information areas, pointer areas, and initialization pointers according to one embodiment.

FIG. 2 illustrates a non-volatile memory 200 of a data storage device according to one embodiment of the invention. As will be described later, the non-volatile memory 200 may comprise an HDD 12 and/or SSD 13—or any other appropriate non-volatile memory medium—in the data storage device 100 shown in FIG. 1.

The non-volatile memory 200 comprises first initialization information area (INA) 230 and an optional INA 240. First INA 230 includes first initialization information (INI) 235 and, in one embodiment, first INA 230 may have additional space 236 to store multiple INIs. The optional INA 240 includes second INI 245 and additional space 246. Although shown as being smaller for ease of depiction, additional spaces 236 and 246 may be, and generally will be, physically larger than first and second INIs 235 and 245, respectively. For instance, INA 230 and 240 may comprise numerous instances of initialization information as various versions of initialization information are written to INA 230 and 240. Initialization pointers (INP) first INP 210 and second INP 210' are stored in a pointer area (PA) 220. The PA 220 may comprise multiple INPs as illustrated by blocks 221-229. Non-volatile memory 200 will typically also have memory 290 for system and user data.

INI may comprise information used by the data storage device for a variety of purposes, including for example system program code, system data, system hardware configuration information such as servo or channel settings, user hardware or firmware settings or preferences, file information, system resource allocation, permissions, factory information, logical-to-physical mapping information, defect information, lookup tables, error information, wear leveling information or other information that may be needed to bring the data storage device to a fully operational condition. Information in the INI may be changed at any time due to normal operation or changes in system or user requirements.

In this embodiment, non-volatile memory 200 comprises data that is addressed by the processor 11 according to physical block address (PBA). For clarity, memory contents are illustrated singly, but may comprise one or more physical memory locations addressed through PBAs, such as sectors or pages. In some embodiments, PBAs may be mapped to logical block addresses (LBAs) that may be used for addressing by a host connected to the data storage device 100. LBAs may be consecutively numbered, but mapped to non-consecutive physical locations with non-consecutive PBAs. Such mapping schemes are advantageous for HDD and SSD storage devices according to some embodiments. It will be apparent to one of skill in the art that any such mapping schemes may be used without departing from the spirit of the invention. The expression PBA may therefore include embodiments with LBA address mapping.

First INP 210 shown in block 221 of PA 220 comprises first PBA pointer 211, first sequence identifier 212, and first metadata 213. Second INP 210' shown in block 226 of PA 220 comprises second PBA pointer 211', second sequence identifier 212', and second metadata 213'. INPs stored in PA 220 may be in any order. For example, in one embodiment, block 221 is written with a first INP and then block 222 is written with the next INP and so forth. When all of the blocks 221-229 are full, the next INP may be written to the least-recently used block (i.e., block 221) and the process continues as before. As will be discussed further below, PA 220 may comprise one or more tracks of an HDD or, in another embodiment, PA 220 may comprise one or more blocks of non-volatile semiconductor memory.

First PBA pointer 211 comprises the PBA of first PBA starting location 231. First PBA location 231 is the starting address where first INI 235 is stored within INA 230. In another embodiment, first PBA pointer 211 may comprise more than one PBA. For example, first PBA pointer 211 may point to two or more different types of INIs that are located at different PBAs. When any of the different types of INIs are updated, a new PBA pointer may be written to point to all of the current INI locations.

First sequence identifier 212 comprises information related to the order that first INP 210 was written into PA 220. Sequence identifiers may be any data that can be used to determine that an INP has been written after other INPs in the PA or signify a version or revision of an INP. Sequence identifiers may comprise for example: a revision number, a sequence string, a sequence number, a time stamp, and/or a validation code.

First INP 210 may optionally comprise first metadata 213. Metadata may be for example: additional pointers, code, parameters, or initialization information. Embodiments of the invention may find the optional metadata space useful for initialization and the invention is not limited by the contents or absence of metadata.

PA 220 may comprise more than one INP, and in one embodiment of the invention, updating INI may be performed by writing second INI 245 and second INP 210'. The contents of second INP 210' follow the same description as first INP 210, however, second INP 210' comprises more recent information. Second PBA pointer 211' comprises a pointer that now points to second PBA starting location 241 for second INI 245. Second sequence identifier 212' comprises contents that can be recognized as more recent than all other sequence identifiers contained in PA 220. Optional second metadata 213' may comprise updated metadata. In other embodiments, second INI 245 may be in first INA 230 or in a separated location, such as a separate physical medium. The separate physical medium may be a different volume, a different disk surface, or a different semiconductor memory, for example.

Figure 3:
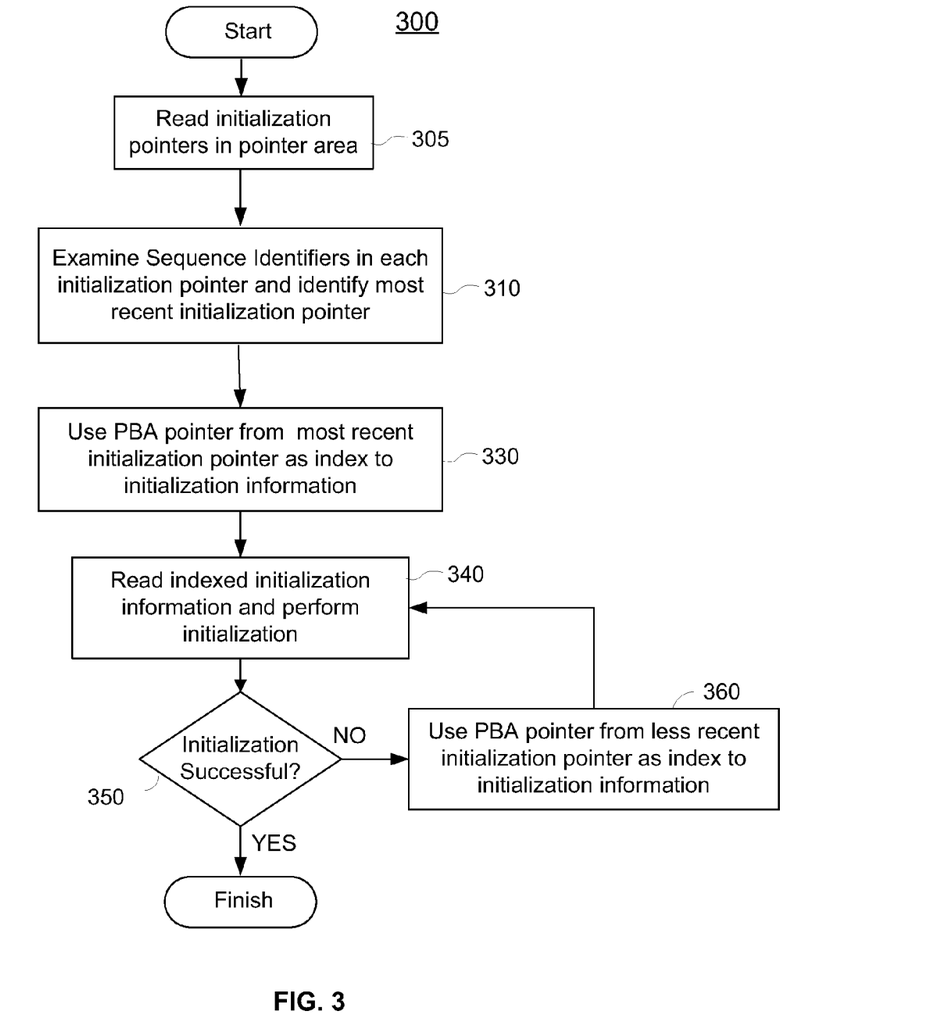
FIG. 3 is a flow chart illustrating a process for initialization of a data storage device according to one embodiment of the invention.

FIG. 3 is a flow chart of a process 300 for initializing of a data storage device according to one embodiment of the invention. Beginning at block 305, typically performed after power-on or reset operations, a processor will read the INPs contained in the PA. In block 310, the processor will examine the sequence identifiers contained in each INP to determine which is the most recent. In block 330, the processor uses the PBA pointer from the most recent INP as an index to the PBA starting location of most recent INI. In block 340, the processor reads the data beginning at the PBA starting location and performs initialization. Once initialization has completed or become interrupted, the process checks to see if the initialization process was successful in block 350. If the initialization was successful, the operation is completed. If the initialization was not successful, the process begins recovery in block 360. In block 360, the process will use a less recent—typically the next most recent—INP and PBA pointer, and return to block 340 to index to the previous INI and perform initialization using the selected INI. In the event of further failures, additional prior INPs may be used to access older INIs by repeating blocks 340, 350, and 360 until a successful initialization is achieved. In other embodiments, the process may stop and/or an error message may be provided to the user or host after a certain number of unsuccessful initialization attempts.

Figure 4:
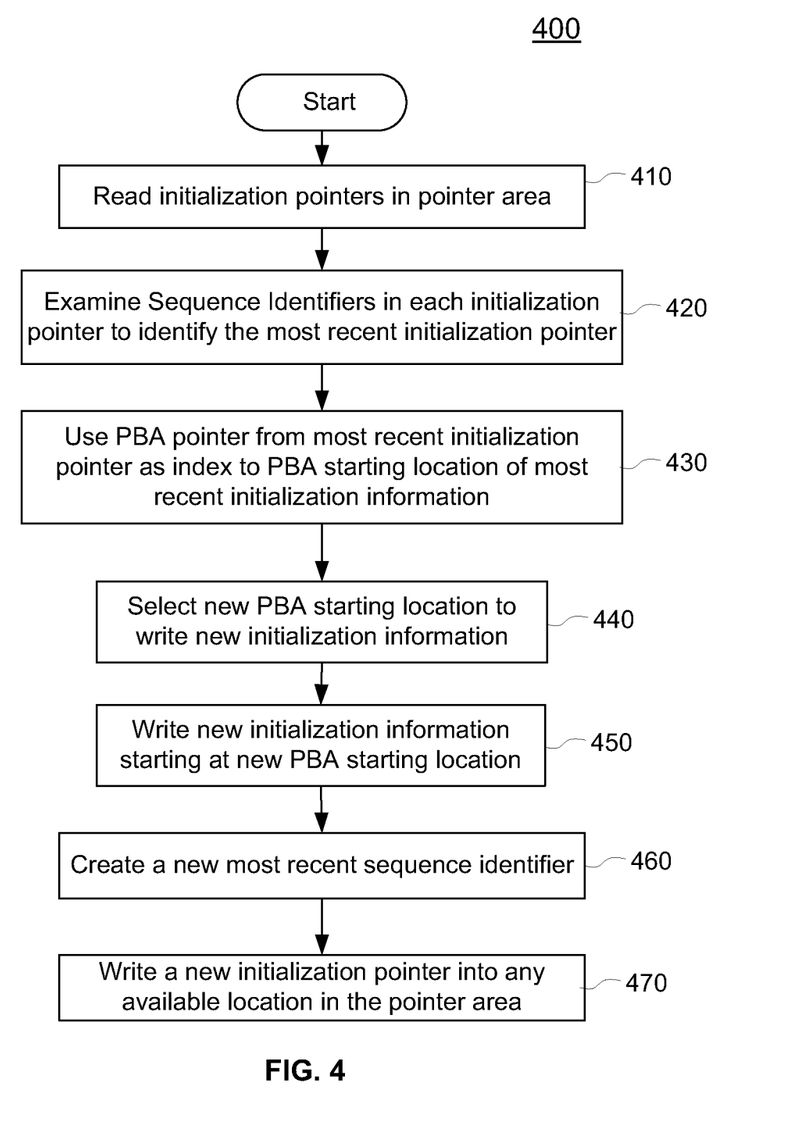
FIG. 4 is a flow chart illustrating a process for updating initialization information according to one embodiment of the invention.

FIG. 4 is a flow chart of a process 400 for updating initialization information according to one embodiment of the invention. For example, new initialization information may be stored in the first INA 230 when an updated mapping table of LBAs to PBAs is flushed to the non-volatile storage due to recent user data writes. Beginning in block 410, a processor will read the INPs contained in the PA. In block 420, the processor will examine the sequence identifiers contained in each INP to determine which is the most recent. In block 430, the processor uses the PBA pointer from the most recent INP as an index to determine the PBA starting location of most recent INI. In block 440, the processor uses the PBA starting location to select a location to put the new INI. In some embodiments, the new INI location may be in optional PA 240 or a different medium, page or erase block. In block 450, the processor writes the new INI to the selected location. In block 460, the processor creates a new most recent PBA pointer, which includes a most recent sequence identifier. In block 470, the processor writes a new INP into any available location in the PA. For example, in one embodiment, the new INP may be written to the next available location in PA 220 of FIG. 2 or may overwrite the least-recently used location in PA 220 if all of the locations have been used.

In another embodiment, rather than perform blocks 410, 420, and 430, the processor may store the location of the most recent initialization information and/or the most recent initialization pointer in volatile memory after determining that initialization was successful in block 350 of FIG. 3. This information can then be quickly accessed for use in block 440. In this embodiment, each time new initialization information and/or a new initialization pointer is written to non-volatile memory, the new locations would be stored on volatile memory for later use in block 440 of FIG. 4.

Figure 5:
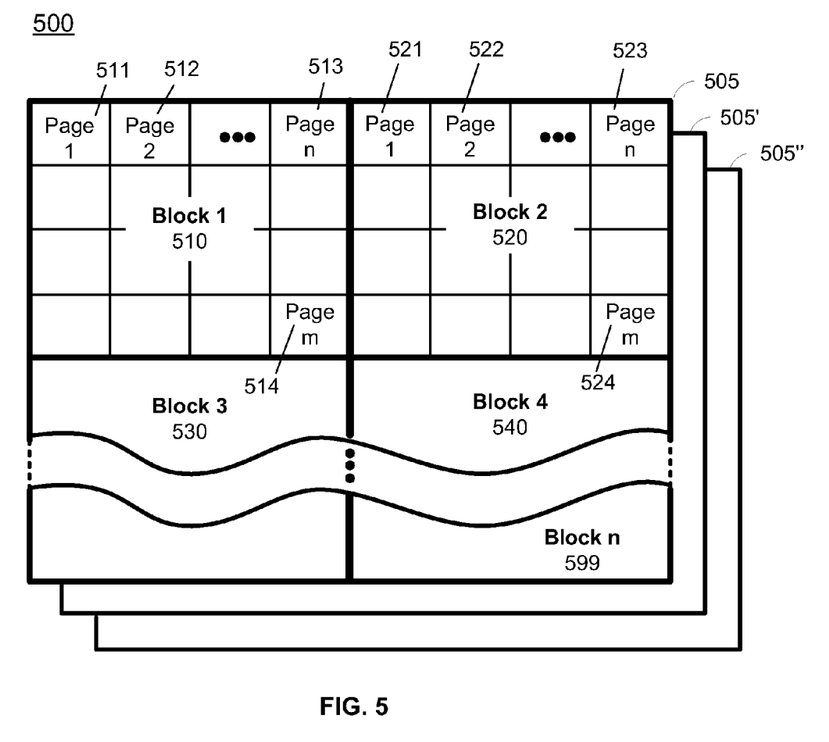
FIG. 5 illustrates a conceptual overview of a solid state storage device according to one embodiment.
Figure 6:
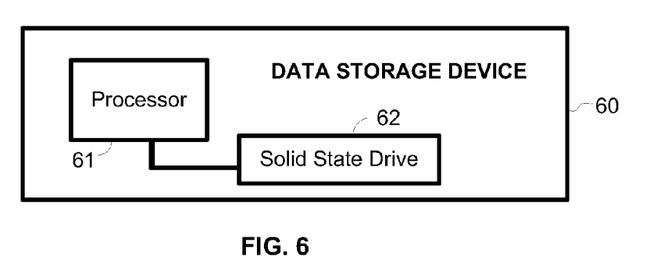
FIG. 6 illustrates a solid state drive according to one embodiment.

FIG. 5 illustrates a conceptual overview of solid state memory 500 according to one embodiment, which may be in SSD 62 shown in data storage device 60 in FIG. 6. Solid state memory 500 may comprise multiple physical memory devices mapped to PBAs of data storage device 100. Semiconductor memories 505, 505' and 505" in solid state memory 500 are shown as an example, and more or less such devices may be found in data storage device 60.

Semiconductor memory 505 may comprise any non-volatile semiconductor memory, for example, NAND flash memory. In one embodiment, semiconductor memory 505 may be divided into erase blocks 510, 520, 530, 540, and extending to ending erase block 599. In this embodiment, an erase block is a portion of the semiconductor memory 505 that can be written (sometimes referred to as programming) and erased independently from all other erase blocks.

In one embodiment, one or more erase blocks may be divided into pages. Erase block 510 is shown divided into page 1, page 2, page n, and up to page m shown as 511, 512, 513, and 514 respectively. Erase block 520 is similarly divided into page 1, page 2, page n and up to page m shown as 521, 522, 523, and 524 respectively. All the erase blocks in semiconductor memory 505 may be similarly divided into pages. In some embodiments with NAND memory, a page may be a portion of an erase block that can be accessed by one or more PBAs and can be written as a unit. In order to rewrite a page that has been previously written, the entire erase block must typically be erased first. If a hazardous event such as power loss occurs during writing or erasing of an NAND memory, loss of data may occur. If the writing or erasing was part of updating INI or INP, the data loss can be catastrophic if not handled properly.

Some embodiments of the invention may prevent such catastrophic loss by writing updated INI and INP into different erase blocks rather than overwriting prior INI and INP. In one embodiment, each update may be written alternately to two erase blocks. In a further embodiment, each update may be written to different pages of an erase block, and in yet another embodiment, updates may be written to different pages of alternating erase blocks. The advantage of maintaining older versions of INI and INP is that they may be used for restore operations in the event that an erase block or page becomes corrupted or the new update is inoperable.

Figure 7:
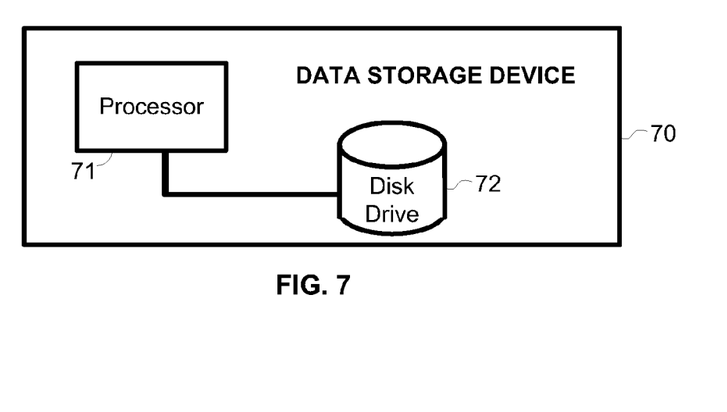
FIG. 7 illustrates a disk drive according to one embodiment.

FIG. 7 illustrates a data storage device 70 according to one embodiment of the invention. Data storage device 70 includes a processor 71, and a disk drive 72. The disk drive 72 may comprise one or more magnetic disks for storing data and one or more heads for accessing the data on the disk surface. Disk drive 72 may also comprise non-volatile semiconductor memory, sometimes referred to as a hybrid drive. The processor 71 may be tightly coupled with the disk drive 72 by being included on a PCBA of the disk drive 72 or the processor may communicate remotely with the disk drive 72 over an interface.

Figure 8:
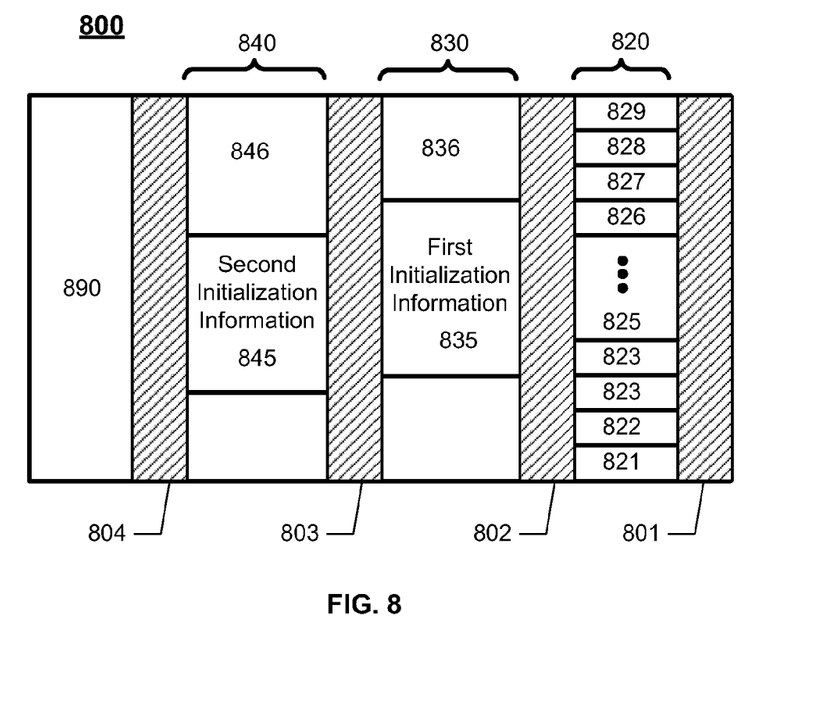
FIG. 8 illustrates a shingle formatted HDD according to one embodiment.

FIG. 8 illustrates a non-volatile memory 800 similar to the non-volatile memory 200 illustrated in FIG. 2 according to one embodiment. The non-volatile memory 200 may be embodied in a disk drive 62 that is written in a shingle format, which is a method of writing adjacent concentric tracks of data with wide tracks using a write transducer that has a writer width greater than the final track width. In general, a first track is written as a wide track, and when an adjacent second track is written, it partially overwrites a fraction of the first track leaving a narrow first track and a wide second track. Subsequent writes to adjacent tracks similarly overwrite a fraction of the previous track, leaving behind multiple narrow tracks. The resulting format has higher track density, but has disadvantages for non-sequential or random writing.

In one embodiment, multiple tracks may be written in order from an inner diameter (ID) to an outer diameter (OD) direction of a recording disk, or vice versa. In a band of tracks written in a shingle format, it is typically not possible to write a single track without overwriting adjacent tracks, and various methods have been developed to overcome this potential constraint. Some methods incorporate indirect addressing to break the fixed connection between physical and logical addresses by using address mapping tables. Shingle format and indirect addressing may increase the frequency of updates to mapping tables due to the need to consolidate shingled tracks and recover storage using methods commonly referred to as garbage collection. In addition, since the initialization information itself may employ shingle format, the frequency and duration of risk due to failure or power loss increases substantially.

The non-volatile memory 800 in FIG. 8 comprises PA 820 and INPs 821 through 829, however, the number of INPs and/or initialization information areas are not limited. First INA 830 comprises first INI 835 and additional space 836. Optional second INA 840 comprises second INI 845 and additional space 846. System and user storage is shown in block 890. Guard bands 801, 802, 803, and 804 are provided between the PA 830, first INA 830, optional INA 840, and system and user storage 890. In one embodiment, guard bands 801, 802, 803, and 804 are at least as wide as the write transducer writer width. In another embodiment, guard bands 801, 802, 803, and/or 804 may be wide enough to prevent adjacent track interference or erasure due to stray magnetic flux lines that occur when writing tracks near the area to be protected.

In one embodiment, PA 820 comprises a single track of data. In a further embodiment, PA 820 may be located near the ID of at least one of the disk surfaces. Guard bands 801 and 802 are provided to prevent overwriting of INPs when adjacent tracks are written in shingle format. For example, without guard band 802, if the first INI 835 or any of first INA 830 is written, a wide shingle write transducer may overwrite part of PA 820. Similarly, if PA 820 were written, part of first INA 830 may be overwritten. Guard bands 801, 802, 803, and 804 provide enough space for writing any of PA 820, first INA 830, optional INA 840, and system and user storage 890 without overwriting adjacent areas.

Another advantage of providing guard bands 801 and 802 on each side of PA 820 is that, in some embodiments, PA 820 can operate in a conventional non-shingle format that provides non-sequential and random writing performance.

Some embodiments of the present invention may provide for robust initialization of a data storage device and updating of initialization of INI. In order to protect INI from loss from catastrophic events such as power loss, some embodiments of the invention allow for updating a system while protecting old initialization information without the need to update or preserve any fixed storage location. Also, replacing a fixed boot pointer with a pointer search area permits updating INI and pointers with code that can be protected during updates and allow recovery to a prior initialization pointer and initialization information.

Although the foregoing has been described in terms of certain embodiments, other embodiments will be apparent to those of ordinary skill in the art from the disclosure herein. For example, in an alternative embodiment, operations may be performed concurrently, rather than sequentially, thereby improving performance. In another embodiment, the examination of pointers and initialization may be performed in a hardware implementation and performed automatically without software involvement. A processor may include many alternatives, such as a microprocessor, microcontroller, sequencer, or state machine. Processors may also be local in the data storage device or remotely, such as in a host computer. Alternatives to embody the invention in combinations of hardware, firmware, and/or software running on a processor, or as a hardware implementation that is reconfigurable to operate in multiple modes would be design choices apparent to those of ordinary skill in the art. As a consequence, the system and method of the present invention may be embodied as software which provides such programming, such as a set of instructions and/or metadata embodied within a computer readable medium. The described embodiments have been presented by way of example only and are not intended to limit the scope of the disclosure. Indeed, the novel methods and systems described herein may be embodied in a variety of other forms without departing from the spirit thereof. Thus, the invention is not limited by any preferred embodiments, but is defined by reference to the appended claims.

We claim:

1. A data storage device, comprising:
    non-volatile disk media comprising memory locations identified by physical block addresses (PBAs), the non-volatile disk media further comprising:
        a user data area;
        a first track including a first initialization area storing first initialization program code having a first PBA starting location;
        a second track including a second initialization area storing second initialization program code having a second PBA starting location, the second track being separated from the first track by a first guard band; and
        a third track separated from the first track by a second guard band, the third track including a pointer area comprising:
            first initialization pointer data stored in a first memory location of the pointer area, the first initialization pointer data including a first PBA pointer identifying the first PBA starting location and a first sequence identifier that indicates when the first initialization program code was written to the non-volatile disk media; and second initialization pointer data stored in a second memory location of the pointer area, the second initialization pointer data including a second PBA pointer identifying a second PBA starting location of the second initialization program code and a second sequence identifier that indicates when the second initialization program code was written to the non-volatile disk media; and a processor configured to:
read memory locations in the pointer area to locate the first initialization pointer data and the second initialization pointer data;
determine that the first initialization program code was written to the non-volatile disk media more recently than the second initialization program code based at least in part on the first sequence identifier and the second sequence identifier;
locate the first initialization program code at the first PBA starting location using the first PBA pointer; and
read the first initialization program code to initialize the data storage device.

2. The data storage device of claim 1, wherein the second initialization pointer data is written to a different PBA than the first initialization pointer data.

3. The data storage device of claim 1, wherein the processor is further configured to:
determine that initialization of the data storage device was not successful; and
read the second initialization program code to initialize the data storage device in response to said determining that initialization of the data storage device was not successful.

4. The data storage device of claim 1, wherein the pointer area is a set of sequential PBAs.

5. The data storage device of claim 1, wherein the pointer area comprises a single track of the non-volatile disk media.

6. The data storage device of claim 1, wherein the data storage device further comprises solid state media.

7. A method of initializing a data storage device from initialization program code, the method comprising:
reading a plurality of storage locations from a pointer area of a non-volatile disk media, the pointer area being part of a first track of the non-volatile disk media and storing initialization pointer data;
reading a plurality of sequence identifiers of the initialization pointer data, each of the plurality of sequence identifiers indicating when initialization program code associated with the respective sequence identifier was written to the disk media;
determining an entry of the initialization pointer data that is associated with most recent initialization program code based at least in part on the plurality of sequence identifiers;

reading the most recent initialization program code, from a second track of the non-volatile disk media that is separated from the first track by a guard band; and
initializing the disk media using the most recent initialization program code.

8. The method of claim 7, wherein the plurality of sequence identifiers each comprise at least one of the following:
a revision number;
a sequence string;
a sequence number;
a time stamp; and
a validation code.

9. A method for updating initialization pointer data in a pointer area of a data storage device, the method comprising:
reading first and second initialization pointers stored in a pointer area of a first track of a non-volatile disk media of a data storage device, each of the first and second initialization pointers including:
PBA pointer data identifying a PBA starting location within an initialization area of the data storage device of initialization program code associated with the respective initialization pointer, the initialization area being part of one or more second tracks of the non-volatile disk media separated from the first track by at least one guard band; and
sequence identifier data that indicates when the initialization program code associated with the respective initialization pointer was written to the data storage device;
examining the sequence identifier data of the first and second initialization pointers;
determining that the first initialization pointer is more current than the second initialization pointer based at least in part on the sequence identifier data of the first and second initialization pointers;
writing updated initialization program code to the initialization area; and
writing a new initialization pointer to the pointer area, wherein the new initialization pointer comprises updated sequence identifier data and new PBA pointer data that points to the updated initialization program code.

10. The method of claim 9, further comprising writing the updated initialization program code to a separate location from a location containing the initialization program code associated with the first initialization pointer.

11. The method of claim 9, further comprising:
storing the first initialization pointer in volatile memory; and
determining where to write the updated initialization program code in the initialization area based on the first initialization pointer.

* * * * *